(12) United States Patent
Bantz et al.

(10) Patent No.: US 7,213,158 B2
(45) Date of Patent: May 1, 2007

(54) DISTRIBUTED AUTONOMIC BACKUP

(75) Inventors: David Frederick Bantz, Chappaqua, NY (US); David Carroll Challener, Raleigh, NC (US); John Peter Karidis, Ossining, NY (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 836 days.

(21) Appl. No.: 10/185,788

(22) Filed: Jun. 28, 2002

(65) Prior Publication Data

US 2004/0003272 A1 Jan. 1, 2004

(51) Int. Cl.
*G06F 12/00* (2006.01)
*G06F 12/14* (2006.01)
*H04L 9/30* (2006.01)
*G06F 15/00* (2006.01)
*G11C 29/00* (2006.01)

(52) U.S. Cl. ............... 713/193; 707/204; 711/162; 709/203; 714/770

(58) Field of Classification Search ......... 713/193; 711/161–162; 714/6, 770; 707/200–204, 707/10; 709/203, 219
See application file for complete search history.

(56) References Cited

U.S. PATENT DOCUMENTS

| | | | | |
|---|---|---|---|---|
| 5,428,785 A | | 6/1995 | Morel et al. ............... 395/700 |
| 5,495,533 A | * | 2/1996 | Linehan et al. ............ 713/155 |
| 5,751,997 A | | 5/1998 | Kullick et al. ............. 395/489 |
| 5,768,623 A | | 6/1998 | Judd et al. ................ 395/857 |
| 5,813,009 A | * | 9/1998 | Johnson et al. ............ 707/100 |
| 5,819,296 A | | 10/1998 | Anderson et al. .......... 707/204 |
| 5,931,947 A | | 8/1999 | Burns et al. .............. 713/201 |
| 5,991,772 A | * | 11/1999 | Doherty et al. ............ 707/202 |
| 6,003,044 A | | 12/1999 | Pongracz et al. ........... 707/204 |
| 6,029,232 A | | 2/2000 | Honda ...................... 711/162 |
| 6,032,236 A | | 2/2000 | Honda ...................... 711/162 |
| 6,173,376 B1 | | 1/2001 | Fowler et al. ............. 711/162 |
| 6,189,079 B1 | | 2/2001 | Micka et al. .............. 711/162 |
| 6,205,527 B1 | | 3/2001 | Goshey et al. ............. 711/162 |
| 6,289,426 B1 | | 9/2001 | Maffezzoni et al. ........ 711/173 |
| 6,314,190 B1 | * | 11/2001 | Zimmermann .............. 380/282 |
| 6,505,216 B1 | * | 1/2003 | Schutzman et al. ......... 707/204 |
| 6,757,699 B2 | * | 6/2004 | Lowry ...................... 707/205 |
| 6,986,043 B2 | * | 1/2006 | Andrew et al. ............. 713/166 |
| 7,159,050 B2 | * | 1/2007 | Miyata et al. .............. 710/33 |
| 2002/0069363 A1 | * | 6/2002 | Winbum .................... 713/200 |
| 2002/0077986 A1 | * | 6/2002 | Kobata et al. .............. 705/52 |
| 2002/0138504 A1 | * | 9/2002 | Yano et al. ................ 707/204 |
| 2002/0162047 A1 | * | 10/2002 | Peters et al. ................. 714/5 |

OTHER PUBLICATIONS

IBM Technical Disclosure Bulletin, Oct. 1997, Power On Self Test Complete Alert for Remote Management System Level Maintenance, p. 131-132.*

* cited by examiner

*Primary Examiner*—Emmanuel L. Moise
*Assistant Examiner*—Minh Dieu Nguyen
(74) *Attorney, Agent, or Firm*—Kunzler & McKenzie; J. Bruce Schelkopf; Carlos Munoz-Bustamante

(57) ABSTRACT

The disclosed methods provide a reliable and secure method of automatically backing up a client's data on a personal computer by using excess storage capacity on a set of one or more predetermined computers, without the need for dedicated servers, server disks, removable storage media, or intervention by a user to assist with the storage devices. The methods of the present invention permit a user, be it an individual or a large company, to inexpensively and securely back up information without the need to acquire additional expensive hardware.

20 Claims, 1 Drawing Sheet

DISTRIBUTED AUTONOMIC BACKUP

BACKGROUND OF THE INVENTION

1. The Field of the Invention

The invention relates to the field of personal computers, and more particularly to the ability to securely and automatically and reliably self-manage backing up data of personal computing systems while minimizing the need for human interactions.

2. Background of the Art

Within the past two decades the development of raw computing power coupled with the proliferation of computer devices has grown at exponential rates. This phenomenal growth along with the advent of the Internet have led to a new age of accessibility, particularly by computing devices—to other people, other systems, and most importantly, to information. New levels of complexity, in communication, networking and information management and storage, unfortunately have also arisen concurrent with this phenomenal growth.

The simultaneous explosion of information and integration of technology into everyday life has brought on new demands for how people manage and maintain computer systems. As the computing industry continues its growth, it appears that the marketplace is rapidly reaching a juncture in the evolution of the industry's views toward computing in general and the associated infrastructure, middleware, and services that maintain them. At this juncture is the realization that the ever-increasing system complexity is reaching a level beyond human ability to manage and secure. This increasing complexity with a shortage of skilled I/T professionals points towards an inevitable need to automate many of the functions associated with computing today.

IBM recognizes the need to automate many of the functions associated with computing today, and is setting forth a vision for the future of computing as "autonomic computing." This new paradigm shifts the fundamental definition of the technology age from one of computing, to one defined by data. Access to data from multiple, distributed sources, in addition to traditional centralized storage devices will allow users to transparently access information when and where they need it. At the same time, this new view of computing will necessitate changing the industry's focus on processing speed and storage to one of developing distributed networks that are largely self-managing, self-diagnostic, and transparent to the user.

This new computer paradigm requires that the design and implementation of computer systems, software, storage and support must exhibit certain basic fundamentals from a user perspective: (1) the system must be flexible such that it will be able to sift data via a platform- and device-agnostic approach; (2) the nature of the autonomic system is that it is always on; and (3) the system will perform its tasks and adapt to a user's needs without dragging the user into the intricacies of its workings (i.e., transparent).

IBM has already introduced certain solutions in the realm of autonomic computing solutions such as: the Intelligent Resource Director (IRD), a self-managing operating system for the eServer z900, which allows the server to dynamically reallocate processing power to a given application as workload demands increase; Workload Management, which is available for IBM's mainframes and is being extended to heterogeneous platforms; the self-healing cellular architecture of Blue Gene, a high-speed machine now under construction at IBM Research, which will detect failed processors and redistribute work to compensate for their loss without interruption; and Tivoli's Intrusion Manager, an integrated approach to security that reduces the overall complexity of security management.

However, though these solutions are ideal for the specific areas of autonomic computing they solve, these solutions are not focused towards resolving problems personal computer users face concerning general data backup on user systems.

Data backup is a significant problem that has been identified by many personal computer users, in small and large businesses. For instance, the failure of a hard-drive can result in significant losses to individuals and businesses, not only in the form of the data itself, but also in terms of the user's time (spent recovering some of the data), integrity of the company's files, the IT shop's time assisting the user and restoring any data that might have been backed up on servers or off-line storage, and in certain cases, the true authentication of original data.

It is known that there exist many software, utilities-based and hardware offerings that purport to assist a user in storing data locally to their own hard drive. It is also known that recent offerings are being made available to permit the users on the network to store data on the network. Each of these types of offerings is limited however, as the former often limits storage to a local hard drive or a local attached storage device, and the latter is cost-prohibitive to many individual and business users. For instance the recent offering by EMC, called the EMC Centera, is noted in a Network World article (Apr. 29, 2002) as being, a device that is a hardware array with embedded software that resides on an Ethernet network and handles the storage of content such as electronic documents, movies, e-mail, check images and broadcast content. However, the reported cost of the EMC Centera product in excess of $200,000.

Similarly, even the locally stored offerings, such as ZIP drives, CD-R or CD-RW media, though less costly than network offerings, remain relatively expensive, and are costly to a user in terms of time as well since the use of these offerings can be time-consuming as well. Additionally, with each of these types of offerings there is the underlying requirement that a user be reasonably knowledgeable and/or disciplined in the process of performing back ups to their system, consistently.

However, it is believed that user's of personal computer will soon have a multitude of excess storage capacity on their systems. This excess capacity is due in part to the density gains made in magnetic storage media as well as the reduced costs to acquire storage capacity. For instance, magnetic storage density continues to increase at roughly 100% per year, which is at a pace that is more rapid than the growth forecasts for user storage requirements. As a result, it is likely that users will be able to afford more storage than they actually need in typical PC clients. Additionally, for example, 3.5" desktop drives represent the least expensive form of on-line magnetic storage on a per-GB basis (i.e., these drives are cheaper than server drives which feature higher rotation rates and faster interfaces, and cheaper than notebook drives, although they are also moving to much higher capacities in the near future).

It is important to note however that there is a lower limit to the cost of any hard-drive, based on the need for at least one platter, one head, one spindle motor, one actuator arm, and a minimal suite of electronics. As a result, hard-drives do not scale to very low capacities in a cost-efficient manner as the fixed costs remain. Soon, therefore, it is foreseeable that as the capacity of even the lowest-cost desktop drives will be far higher than most users require, there still remain a minimum fixed cost point. Akin to the desktop market, it is likely that the capacity of low-end notebook drives would therefore also exceed a user's actual needs and/or requirements, as well as achieving a fixed cost point.

As used herein the terms "personal computer," "computer," "PC," "system," "computing device," and "server," whether in their singular or plural form, are used interchangeably and are intended to have similar meanings and uses in relation to functions and characteristics associated with electronic information handling systems. Further, it is realized that "storage medium" of a computer may be integrated or separate from a computer (such as hard disk or a compact disc, for example), and that the term "storage medium" as used herein is intended to be used interchangeably as such.

SUMMARY OF THE INVENTION

Therefore, what is needed is a reliable and secure method of automatically backing up client PCs in a relatively inexpensive, user-friendly, manner for any user, whether the user be an individual having a single PC with access to other users, a small businesses having tens or hundreds of PCs, or a large corporation having thousands of PCs or more. Further it is desirable to have a method that is also devoid of dedicated servers and server drives, and the need for manual intervention of users to work with removable storage media and equipment, but yet is able to readily utilize other computers' excess storage capacities in a secure and inexpensive manner.

The present invention is directed to a reliable and secure method of automatically backing up a client's PCs using excess capacity on one or more predetermined computers, without the need for dedicated servers, server disks, removable storage media, or intervention by a user.

In one embodiment, the present invention is directed to a secure method of automatically backing up information resident on a user computer using excess capacity on a set of predetermined computers. A user may first identify or automatically set for identification one or more datasets comprising information resident on the computer to be selectively stored (e.g., all the data or a subset of the data resident on the user computer). Each identified dataset is then compressed at a predetermined compression rate into a compressed dataset. Once compressed, each dataset is then encrypted by an encryption means to create an encrypted dataset. Thereafter, each encrypted dataset is segmented into a predetermined number of segments. Each segment of each encrypted dataset is then distributed to the set of predetermined computers having excess capacity. For this embodiment, the one or more identified datasets have been parsed into segments and stored in excess capacity storage locations away from the local user. The key used to perform the encryption is itself encrypted using an encryption key, which is in turn under control of the user, either through a security chip such as a TCPA or ESS chip or in some other suitable secure place. Thus the symmetric file encryption key is itself backed up.

In a second embodiment, the present invention is directed to a secure method of automatically backing up information resident on a computer thereafter selectively recovering the automatically backed up data from a subset of said set of predetermined computers. In this embodiment, following identifying at least one datasets comprising information resident on the computer to be selectively stored, each dataset is then compressed at a predetermined compression rate into a compressed dataset. Once compressed, each dataset is then encrypted by an encryption means to create an encrypted dataset. Thereafter, each encrypted dataset is segmented into a predetermined number of segments. Each segment of each encrypted dataset is then distributed to the set of predetermined computers, of a minimal number, having excess capacity. A storing means stores each unique identifier relating the location of each distributed encrypted dataset segment to the predetermined computer on which the respective segment resides following distribution. Upon a user seeking recovery of the stored data, each stored unique identifier is recovered, and from the data of the unique identifiers, at least a predetermined number of encrypted dataset segments previously distributed is retrieved. Once retrieved, each of segment is combined and decrypted to recover the at least one dataset stored.

In a third embodiment, the present invention is directed to an autonomic software module that permits a user a secure method of automatically backing up information resident on a user computer by storing it on a set of predetermined computers, and thereafter selectively recovering the automatically backed up information from a subset of said subset of the set of predetermined computers on which segments of the information have been stored.

In a fourth embodiment, the present invention is directed to a computer configured with an autonomic software module providing for the secure and automatic backing up of information resident on said computer.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION OF THE PREFERRED EMBODIMENTS

Figure 1:
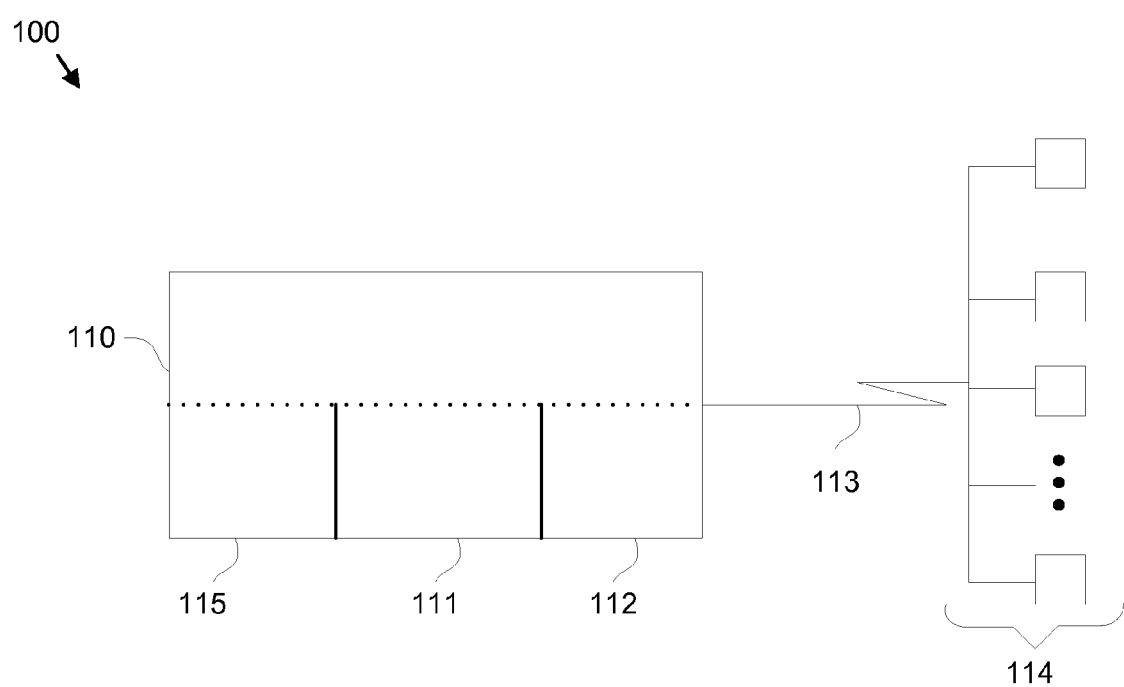
FIG. 1 illustrates an autonomic storing system configured in accordance with the present invention.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings.

FIG. 1 illustrates an autonomic storing system configured in accordance with the present invention. An autonomic storing system (100) of a preferred embodiment of the present invention comprises a user computer (110) having a data storage medium (111), a computer-usable medium (112) embodying computer-readable program code, such as a software application or utility, and connectivity (113) to a set of computers (114) apart from the user computer (110). In a preferred embodiment, the user computer (110) is connected to the set of computer (114) by a communication link apart of a network configuration. However, the present invention may also be used where the user computer is linked with computers via the internet, cable modems, wireless technologies, and the like, such that a user computer does not have to be an integrated part of a dedicated network architecture. In the user computer (110), information (also used herein as "data") (115) may be of any data format and is resident on an integrated or peripheral data storage medium (111).

Preferably, the software (112) is preloaded with the user computer (110) such that it may be initialized by the user upon first use, at the time of "set up." On first use, the user can make initial choices for preferred backup characteristics (e.g., type of back up, frequency, copies, etc.). By default, a separate partition could be placed on the client drive (111), and that partition would be set to "shared". By setting the value to "shared," this prevents the backup data from affecting the user's primary partition and eliminates the need for shared access to the primary partition. During this setup process, an initial "map" of peer clients that are accessible on the network and participating in the back up process would also be created. Alternatively, a "map" of peer clients that are accessible on the network and participating in the back up process could also be created following the boot up on each active session by the user.

In a preferred embodiment, the user defines a back up characteristic to back up on a daily basis.

In this situation, during normal, daily operation, each client machine periodically creates one or more "standard" backup files (either a complete disk image, an incremental disk backup, or selected file backup), which could be done using existing backup utilities. Also during the day, each client machine might update their map of "participating" client machines. Alternatively, information of standard backup files and map updates may be sent to a computer that becomes active on a network or via an authorized internet connection. Similarly, each evening, at a prescribed period if desired, each client would perform the following operations on their own "standard" backup "file (wherein the particular order set forth below is for exemplary purposes only as the present invention is not limited to a prescribed or specific order of the following operations, excepting that the only procedural limitation of the operations set forth is that it would be understood that an operation of compression would occur prior to an operation of encryption. In one embodiment, the compression rate is at least a multiple of one and no greater than a multiple of seven. Further, the encrypted key can be stored with the data before or after segmentation, before or after the encryption takes place— but the encrypted symmetric key must not be itself encrypted with itself.)

A) Compress the file;
B) Redundantly encode the file in a suitable manner, in preparation for the next step;
C) obtain an encryption key or keys for encrypting the file/files
D) Encrypt a copy of the encryption key with another encryption key (such as a public key or a symmetric key)
E) Split the file into "M" interleaved portions, such that all of the data can be recovered using any "N" of the "M" interleaved segments;
F) Encrypt the M segments;
G) Store the encrypted copy of the encryption key or keys with the segmentsand
H) Store the M interleaved segments on the shared partitions of M other clients on the network.

For the present invention, the number "M" of interleaved portions (i.e., segments) is a value that is commensurate with the predetermined number of available computers having excess capacity available to share with the primary client computer and a predetermined redundancy factor selected by the user. In one embodiment, "M" is in a range from ten to one hundred. Additionally, the number "M" is greater than the number "N" which is a subset of the set of predetermined number of available computers having excess capacity available to share with the primary client computer. The value of "N" however is equal to at least the minimum number of computers necessary to recreate the dataset file. As the availability of the number of available computers having excess capacity available to share with the primary client computer may vary with time, the values and ability to recognize the availability at a particular point in time, may fluctuate given the number of computers available at a predetermined time.

For instance, at a particular point in time, if there were 6 computers having excess capacity available to share with the primary client computer, the compressed data to be stored was suitable to be stored at two (2) computers, and the predetermined redundancy factor selected by the user was a multiple of 2×, then the total number of segments to divide the data into would be four (4) wherein there would be a double redundancy. The four (4) segments would then be encrypted and distributed according to the present invention to four (4) of the six (6) computers. Additionally, for further assurance of recovery of stored data, it is also envisioned by the present invention that a data segment would be created, encrypted and distributed to all available and active computers having excess capacity available to share with the primary client computer at a particular time. Further, to improve the number of computers in communication (i.e., connected) with a primary client computer, each computer, i.e., all clients (including the primary client computer), could be scheduled to wake up at a certain time, or any one machine could potentially use the Wake-On-LAN (WOL) function to wake up other clients as required.

In this situation, when a user desires recovery of data previously encrypted, distributed and stored across other computers, the user could fetch at least "N" of the previously distributed "M" segments of the required backup file. Upon retrieval of at least "N" segments, the user may then decrypt the retrieved "N" segments, such that both the interleaving step is reversed, and the redundancy is eliminated. Once decrypted, the file would be decompressed to result in the "standard" backup file. Once decompressed, the normal restore utilities could be used to restore the "standard" backup file to the original file or drive image.

For the present invention, each client in effect provides a portion of their own storage capacity to a shared backup space. Preferably, this shared space is dedicated to the activity. In return, each client gains the ability to securely and reliably store their own backup files quickly and inexpensively across a set of predetermined computers, while maintaining a high degree of probability that the stored data will be readily available when sought for retrieval in the future by the user.

In a further embodiment, the present invention includes personal computers and a software application (for instance preloaded thereon) that causes the personal computer of user to automatically search for "like" devices on a network, such that when a like device is identified, the excess disk capacity of the like devices in this network of client machines is identified and the space is used to collaboratively and automatically back up data from each machine identified. For instance, an entire disk image(s) and/or selected files/folders/partitions could be backed up and then that data stored in a secure, distributed, redundant manner on several of the other machines. Additionally, in the event a machine failed or files were lost, the recovery data could be recovered from the remainder of the devices on the network having received a segment previously, even where some of the devices on the network were not available.

For the present invention, all backup data on all devices is encrypted for privacy and security, and it is envisioned that the system could also be set up to leverage further security from an embedded security chip present in certain computers. For instance, in IBM clients, an embedded security chips resides therein such that only the specific hardware client that generated the backup data could ever reconstitute the data.

In this manner, for instance, using IBM's Embedded Security Subsystem (ESS), which conforms to the TCPA (Trusted Computing Platform Alliance) specification, further security steps may be employed using the present invention, inclusive of encryption and decryption means envisioned herein.

The IBM security chip is integrated into the motherboard, and provides a secure area to store encryption keys (i.e., encryption means) used to mathematically scramble data so it can only be decoded by an authorized party. As the keys are stored within the chip, and not on the hard drive, the strokes can't be stolen and exploited by unauthorized users. Similarly, for decryption, an IBM computer having the security chips enables encrypted data to be readily unscrambled according to the encryption means present. For instance, the IBM security chip is available in IBM's Think-Pad® T30 notebook, and the creation of keys is now executed inside the chip, improving the security. Additionally, certain select IBM NetVista® PCs using the IBM 256 bit Embedded Security Chip provide additional protection of vital encryption and signature keys in the Microsoft® Windows environment such that when these devices are combined together with Intel"s IP Sec adapters which help create a secure network connection, an overall security program to provide for an affordable, secure client computing environment is readily established.

In a preferred embodiment of the present invention, using an encryption key available only with a security chip such as but not limited to that of IBM (as used herein also known as a TCPA chip), enables the creation of an encryption key that is available only to that particular machine. Similarly, by storing metadata that uniquely defines a source machine from which each encrypted segment previously discussed was generated in combination with using the security chip, or equivalent, a unique data store from the TCPA chip may be presented. Further, by storing one or more pointers or look up tables in relation to the segments, or by storing a directory of location of those segments (to which said segments were distributed to or generated from) in a TCPA chip, additionally risks are mitigated.

Finally, in a preferred embodiment of the present invention, further secure retrieval measures a re envisioned herein as retrieval of stored data may be performed by first recovering a stored identifier (such as pointers, tables, or unique identifiers), being derived from unique data stored in a TCPA chip.

Further, it is also readily envisioned by the inventors of the present invention that the present invention may also be enhanced or improved with relative ease now that the invention is heretofore been explained, to provide the following additional features and functionality, without limitation:

1) Provide a means for the clients to periodically reconstitute and then redistribute their archived files, in order to eliminate the partial data "loss" when machines are permanently removed from the network;

2) Provide a means to adaptively adjust the selection of values for M and N, as previously defined, as well as the specific choices of the number of clients, to avoid relying on infrequently connected notebooks;

3) Provide a means of temporarily caching backup segments intended for one machine on one of the other machines, so that a machine that is never connected to the network at night can still receive a share portion of backup segments from other machines when it does eventually get connected;

4) Provide a means of distributing backups across geographical locations to address disaster recovery requirements;

5) Provide a means for the clients to determine which machines are available that contain the recent records of data necessary for reconstitution; and 6) If the solution involves rollback, with periodic storage, make sure that a predetermined number of versions of each rollback are available at time or reconstitution.

The present invention also has other possibilities such as using the methods for secure access in military applications, manufacturing environments and retail space sectors, without limitation. It is evident that the invention is suitable for use under these and other circumstances, as system attributes may often require updating or modification in a variety of locations and markets, wherever computers exist. It is also evident that the present invention could be implemented in other manners and by other methods.

It will be further understood that various changes in the details, materials, and arrangements of the parts which have been described and illustrated in order to explain the nature of this invention may be made by those skilled in the art without departing from the principle and scope of the invention as expressed in the following claims. For instance, the use of varied or dynamic compression rates or rates commensurate with reducing space allocations required for various formats of data are envisioned herein.

What is claimed is:

1. A secure method for automatically backing up information resident on a user computer using excess capacity on a set of predetermined computers, comprising the steps of:

identifying a dataset from said information to be stored, compressing the identified dataset at predetermined compression rate into a compressed dataset, redundantly encoding the compressed dataset for segmentation into a predetermined number of segments that does not exceed a number of the predetermined computers, such that a specified number of segments can recover the dataset and the specified number of segments is less than the predetermined number of segments, segmenting the encoded dataset into the predetermined number of dataset segments, encrypting each dataset segment with an encryption key, encrypting the encryption key, and appending to each encrypted dataset segment the encrypted encryption key for recovering the dataset segment, distributing each encrypted dataset segment to at least said set of predetermined computers, retrieving the specified number of encrypted dataset segments, decrypting the retrieved encrypted dataset segments, and combining the decrypted dataset segments to form the compressed dataset.

2. The method of claim 1, further comprising the step of storing a copy of one or more encryption keys encrypted with a public key with the encrypted data segments.

3. The method of claim 1, wherein said set of predetermined computers is the number of computers in communication with said user computer at a predetermined point in time.

4. The method of claim 1, wherein said encryption means includes security techniques provided in a TCPA chip.

5. The method of claim 1, wherein said predetermined compression rate is at least a multiple of one and no greater than a multiple of seven.

6. A secure method for automatically backing up data of a user computer using excess capacity on a set of predetermined computers and thereafter selectively recovering said automatically backed up data from a subset of said set of predetermined computers, comprising the steps of:
   (a) identifying at least one dataset of information resident on a user computer to be stored,
   (b) compressing each identified dataset at a predetermined compression rate into a compressed dataset,
   (c) redundantly encoding each compressed dataset for segmentation into a predetermined number of segments that does not exceed a number of the predetermined computers, such that a specified number of segments of each dataset can recover each dataset and the specified number of segments is less than the predetermined number of segments,
   (d) segmenting each encoded dataset into the predetermined number of dataset segments,
   (e) encrypting each dataset segment with one or more encryption keys, encrypting the encryption keys, and appending to each encrypted dataset segment the one or more encrypted encryption keys for recovering said data,
   (f) distributing each encrypted dataset segment to said set of predetermined computers,
   (g) storing by a storing means each unique identifier relating a location of each distributed encrypted dataset segment, respectively,
   (h) recovering each stored unique identifier,
   (i) retrieving at least the specified number of encrypted dataset segments previously distributed for each dataset,
   (j) decrypting each retrieved encrypted dataset segment, and
   (k) combining the decrypted dataset segments for each dataset to form the compressed dataset.

7. The method of claim 6, wherein said predetermined number of predetermined dataset segments is at least equal to the number of computers in said set of predetermined computers.

8. The method of claim 7, wherein said distributing of predetermined number of encrypted dataset segments is distributed to at least twice as computers in said set of predetermined computers as said number of predetermined encrypted dataset segments.

9. The method of claim 6, wherein said predetermined number of encrypted dataset segments is in a range from ten to one hundred.

10. The method of claim 6, further comprising the step of generating an identifier having a unique definition of said user computer and storing said identifier in a secure storage location.

11. The method of claim 10, wherein said identifier is metadata and is stored in a TCPA chip.

12. The method of claim 11, wherein said unique definition is directly related and unique to said TCPA chip.

13. A computer usable medium embodying computer readable program code for causing a computer to identify user selected files of a computer system as preselected data back up preferences in an autonomic manner, identifying said data back up preferences in a file of said program code for execution a predetermined time, executing said program at said predetermined time, creating at least one dataset of information to be stored, compressing each identified dataset at a predetermined compression rate into a compressed dataset, redundantly encoding each compressed dataset for segmentation into a predetermined number of segments that does not exceed a number of the predetermined computers, such that a specified number of segments of each dataset can recover each dataset and the specified number of segments is less than the predetermined number of segments, segmenting each encoded dataset into the predetermined number of dataset segments, encrypting each dataset segment with an encryption key, encrypting the encryption key, and appending to each encrypted dataset segment the encrypted encryption key for recovering the dataset segment, distributing each encrypted dataset segment to a set of predetermined computers, storing by a storing means each unique identifier relating a location of each distributed encrypted dataset segment, respectively, recovering each stored unique identifier, retrieving at least the specified number of encrypted dataset segments previously distributed, decrypting each retrieved encrypted dataset segment, combining the decrypted dataset segments for each dataset to form the compressed dataset.

14. The medium of claim 13, wherein said medium is a preloaded software application.

15. The medium of claim 13, wherein said medium references a TCPA chip of the user computer.

16. The medium of claim 13, wherein said preselected data back up preferences include a user's selection of a daily back up mode.

17. An autonomic computing system comprising a user computer having a data storage medium, a computer-usable medium embodying computer-readable program code, and a set of computers in communication with said user computer at a predetermined time, wherein said program code, on execution, provides for: said user computer to identify user selected files of a computer system as preselected data back up preferences in an autonomic manner, identifying said data back up preferences in a file of said program code for execution a predetermined time, executing said program at said predetermined time, creating at least one dataset of information to be stored, compressing each identified dataset at a predetermined compression rate into a compressed dataset, redundantly encoding each compressed dataset for segmentation into a predetermined number of segments that does not exceed a number of the predetermined computers, such that a specified number of segments of each dataset can recover each dataset and the specified number of segments is less than the predetermined number of segments, segmenting each encoded dataset into the predetermined number of dataset segments, encrypting each dataset segment with an encryption key, encrypting the encryption key, and appending to each encrypted dataset segment the encrypted encryption key for recovering the dataset segment, distributing each encrypted dataset segment to a set of predetermined computers, storing by a storing means each unique identifier relating a location of each distributed encrypted dataset segment, respectively, recovering each stored unique identifier, retrieving at least the specified number of encrypted dataset segments previously distributed, decrypting each retrieved encrypted dataset segment, combining the decrypted dataset segments for each dataset to form the compressed dataset, decompressing the compressed dataset, and presenting said decompressed dataset to a user.

18. The system of claim 17, wherein said medium is a software application.

19. The system of claim 17, wherein said system further comprises a TCPA chip.

20. The system of claim 17, wherein said preselected data back up preferences include a user's selection of a daily back up mode using Wake-On-LAN.

* * * * *